(12) United States Patent
Iwami

(10) Patent No.: US 10,038,580 B2
(45) Date of Patent: *Jul. 31, 2018

(54) MULTI-CARRIER SIGNAL TRANSMITTER AND MULTI-CARRIER SIGNAL RECEIVER

(71) Applicant: Sony Corporation, Tokyo (JP)

(72) Inventor: Hideki Iwami, Saitama (JP)

(73) Assignee: Wi-Fi One, LLC, Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/144,816

(22) Filed: Dec. 31, 2013

(65) Prior Publication Data

US 2014/0211815 A1 Jul. 31, 2014

Related U.S. Application Data

(63) Continuation of application No. 13/212,389, filed on Aug. 18, 2011, now Pat. No. 8,644,345, which is a continuation of application No. 12/412,564, filed on Mar. 27, 2009, now Pat. No. 8,009,700, which is a continuation of application No. 11/811,858, filed on Jun. 11, 2007, now Pat. No. 7,539,217, which is a continuation of application No. 11/115,996, filed on Apr. 27, 2005, now Pat. No. 7,280,563, which is a (Continued)

(30) Foreign Application Priority Data

Aug. 11, 1999 (JP) .................................. P11-227815

(51) Int. Cl.
| | |
|---|---|
| *H04L 5/06* | (2006.01) |
| *H04L 27/26* | (2006.01) |
| *H04L 1/00* | (2006.01) |

(52) U.S. Cl.
CPC ........ *H04L 27/2602* (2013.01); *H04L 1/0071* (2013.01); *H04L 27/2634* (2013.01); *H04L 27/2647* (2013.01); *H04L 1/0059* (2013.01); *H04L 27/2655* (2013.01)

(58) Field of Classification Search
CPC .................................... H04L 5/06; H04J 1/00
See application file for complete search history.

(56) References Cited

U.S. PATENT DOCUMENTS

| | | | | |
|---|---|---|---|---|
| 4,630,042 A | * | 12/1986 | Kawasaki | ............. G07F 11/002 221/4 |
| 5,570,351 A | | 10/1996 | Wornell | |
| 5,625,642 A | | 4/1997 | Wornell | |

(Continued)

FOREIGN PATENT DOCUMENTS

| | | |
|---|---|---|
| EP | 0886408 | 12/1998 |
| JP | 7-099486 A | 4/1995 |
| JP | 11-017643 A | 1/1999 |

*Primary Examiner* — Hassan Phillips
*Assistant Examiner* — Prenell Jones

(57) ABSTRACT

A multi-carrier signal transmission apparatus transmits a transmission stream including at least preamble information necessary for synchronizing a transmission signal and data information as a multi-carrier signal. A modulator generates a transmission symbol stream by modulating an arrangement of the preamble information and the data information. A symbol expanding portion expands the transmission symbol stream on a frequency axis by generating a complex conjugate value of at least one part of the preamble information symmetrically on the frequency axis.

38 Claims, 11 Drawing Sheets

Related U.S. Application Data continuation of application No. 09/807,187, filed as application No. PCT/JP00/05372 on Aug. 10, 2000.

(56) References Cited

U.S. PATENT DOCUMENTS

| | | |
|---|---|---|
| 5,917,858 A | 6/1999 | Sinha et al. |
| 6,181,714 B1 | 1/2001 | Isaksson et al. |
| 6,195,534 B1 * | 2/2001 | Sakoda et al. ................. 455/45 |
| 6,219,596 B1 * | 4/2001 | Fukae ..................... G01S 17/74 |
| | | 180/169 |
| 6,292,651 B1 | 9/2001 | Dapper et al. |
| 6,334,219 B1 | 12/2001 | Hill et al. |
| 6,347,120 B1 | 2/2002 | Sakoda |
| 6,556,639 B1 | 4/2003 | Goldston et al. |
| 6,567,482 B1 | 5/2003 | Popovic' |
| 6,982,992 B1 | 1/2006 | Iwami et al. |
| 7,054,296 B1 | 5/2006 | Sorrells et al. |
| 7,280,563 B2 | 10/2007 | Iwami et al. |
| 7,539,217 B2 | 5/2009 | Iwami |
| 8,009,700 B2 | 8/2011 | Iwami |
| 2010/0008246 A1 | 1/2010 | Watanabe |

* cited by examiner

MULTI-CARRIER SIGNAL TRANSMITTER AND MULTI-CARRIER SIGNAL RECEIVER

CROSS-REFERENCE TO RELATED APPLICATIONS

This application is a continuation of U.S. application Ser. No. 13/212,389, filed on Aug. 18, 2011, which is a continuation of U.S. application Ser. No. 12/412,564, filed on Mar. 27, 2009 (now U.S. Pat. No. 8,009,700 issued Aug. 30, 2011), which is a continuation of U.S. application Ser. No. 11/811,858, filed on Jun. 11, 2007 (now U.S. Pat. No. 7,539,217 issued May 26, 2009), which is a continuation of Ser. No. 11/115,996, filed on Apr. 27, 2005 (now U.S. Pat. No. 7,280,563 issued Oct. 9, 2007), which is a continuation of U.S. application Ser. No. 09/807,187 filed on Aug. 21, 2001 (now U.S. Pat. No. 6,982,992), which is a national stage application under 35 U.S.C. § 371 of International Application No. PCT/JP00/05372, filed Aug. 10, 2000, which claims priority from Japanese Application No. JP11-227815, filed Aug. 11, 1999, the disclosures of which are incorporated herein by reference.

BACKGROUND OF THE INVENTION

Technical Field

The present invention relates to a multi-carrier signal transmitting apparatus and a multi-carrier signal receiving apparatus preferable for application to a case of transmitting multi-carrier signals by radio.

Background Art

Recently, OFDM (Orthogonal Frequency Division Multiplex: orthogonal frequency division multiplexing) system has been employed as a transmission system highly resistant to multi-pass interference as well as having an excellent frequency use efficiency. According to this OFDM system, a plurality of carriers (hereinafter referred to as sub-carrier) orthogonal to each other are disposed at every predetermined frequency interval within a single transmission band and data is distributed to respective sub-carriers and modulated for transmission. According to this system, its transmission apparatus disposes transmission data obtained in time series virtually on a frequency axis, allocates transmission data to each sub-carrier, and orthogonally transforms it to multi-carrier signals at the predetermined frequency interval by reverse fast Fourier transformation or the like. A receiving apparatus thereof converts received multi-carrier signal inversely to transmission time to data secured in time series so as to obtain reception data.

FIG. 1 is a diagram showing an example of the structure of a radio transmission apparatus according to the OFDM system. Hereinafter, the structure will be described. Here, a radio transmission apparatus 100 comprises a video circuit 101 and a voice circuit 102 and the respective circuits 101, 102 carries out processing for encoding the inputted video signal and voice signal. For example, the video circuit 101 performs encoding according to irreversible image compression encoding method such as a processing for converting animation video signal to MPEG (Moving Picture Expers Group) system image data, a processing for converting static image video signal to JPEG (Joint Photographing coding Expers Group) system image data. Or encoding with reversible image compression method like JBIG (Joint Bi-level Image Experts Group) is permissible. A voice circuit 102 carries out encoding based on the MPEG audio method, CELP (Code Excited Linear Prediction) method, PCM (Pulse Code Modulation) method or the like. In the meantime, the coded data may be provided with ECC (Error Correcting Code) such as the Reed-Solomon code, the turbo code and the like.

Video data outputted by a video circuit 101 and voice data outputted by the voice circuit 102 are supplied to a mixing circuit 103 in which they are converted to single-system data. After that, it is supplied to an interleaver 104, in which interleave processing is carried out by changing data arrangement to disperse bit series. Data interleaved by the interleaver 104 is subjected to modulation processing by a modulator 105. In this modulator 105, first, a preamble signal is inserted into the bit sequence and next, as a primary modulation, for example, DQPSK modulation (Differential Quadrature Phase Shift keying) is carried out. In the meantime, other modulation method than the DQPSK modulation may be employed such as QPSK, BPSK, 8PSK, QAM and the like.

Data primarily modulated by the modulator 105 is supplied to a reverse fast Fourier transformation circuit (IFFT circuit) 106 and as a secondary modulation, reverse Fourier transformation processing for converting data disposed on time axis to data arrangement on the frequency axis by arithmetic processing of reverse Fourier transformation is carried out and further, window application processing is carried out by multiplying window data. If the reverse Fourier transformation processing is carried out in this IFFT circuit 106, a transmission symbol stream disposed on the frequency axis virtually up to then is averaged so as to be transmission series. In the IFFT circuit, each time when data of a predetermined unit is inputted, reverse Fourier transformation arithmetic processing is carried out for that inputted data. In this specification, time for carrying out the arithmetic processing of this one unit is called single modulation time.

Output of the IFFT circuit 106 is supplied to a digital/analog converter 107 so as to be converted to analog signal. After the conversion, the analog signal is supplied to a high-frequency portion (RF portion) 108, in which high-frequency processing such as filtering, frequency conversion are carried out so as to gain a transmission signal of a predetermined transmission channel. After that, it is transmitted by radio through an antenna 110. Processing timing in each circuit in the radio transmission apparatus 100 is controlled by a time base controller (TBC) 109.

FIG. 2 is a diagram showing a radio reception apparatus for receiving a signal transmitted from the radio transmission apparatus 100 shown in FIG. 1. Hereinafter, the structure thereof will be described. The radio reception apparatus 200 supplies a signal received by an antenna 201 to a high-frequency portion (RF portion) 202 so as to carry out such reception processing as filtering and frequency conversion. Consequently, a reception signal of a predetermined channel is obtained. This reception signal is supplied to the analog/digital converter 203 and converted to digital data. Reception series subjected to digital conversion is supplied to a window detecting portion 204. This window detecting portion 204 carries out processing for detecting synchronism by detecting a break in data to be subjected to Fourier transformation based on window data multiplied by the transmission system from reception series.

Output of the window detecting portion 204 is supplied to the fast Fourier transformation circuit (FFT circuit) 205 and transformation processing is carried out, in which Fourier transformation action is carried out at the timing of the break in data detected by the window detecting portion 204 and data on the frequency axis is converted to data arrangement on time axis by the arithmetic processing of the Fourier transformation. The reception series Fourier transformed is supplied to a decoder 206, in which decoding processing for returning conversion processing applied at the time of transmission such as the DQPSK modulation is carried out so as to generate a reception symbol stream. This reception symbol stream is supplied to a deinterleaver 207, in which deinterleave processing for returning bit series dispersed by interleave processing at the time of transmission to its original data arrangement is carried out so as to obtain reception encoding bit series. This reception encoding bit series is supplied to a viterbi decoder 208 and converted to reception information bit series by viterbi decoding processing. Video information in the converted reception information bit series is supplied to a video circuit 209 and voice information is supplied to a voice circuit 210.

In the video circuit 209, data encoded by the video circuit 101 of the transmission system is decoded so as to obtain transmitted video data. In the voice circuit 210, data encoded by the voice circuit 102 of the transmission system is decoded so as to obtain transmitted voice data. Processing timing in each circuit in the radio reception apparatus 200 is controlled by a time base controller (TBC) 211.

With the above described structure, transmission and reception of the OFDM system signal are carried out. The primary modulation by the modulator 105 at the time of transmission is a modulation system in which the phase of carrier is changed in discrete manner depending on transmission data, so that it has a large advantage in frequency application efficiency. Because, in the reverse Fourier transformation processing in the IFFT circuit 106, the bit series disposed on the subcarrier is averaged on time axis, it has such a large advantage that it is highly resistant to interfering wave such as fading and shadowing. However, on the side receiving such multi-carrier signal, respective bit series cannot be decoded until Fourier transformation processing in the FFT circuit 205 is carried out. If a break for one modulation (hereinafter referred to break) is not recognized properly when the FFT circuit 205 executes the Fourier transformation processing at the time of reception, accurate bit series cannot be decoded.

To achieve proper Fourier transformation action in the FFT circuit, it is necessary to determine the break depending on a power level of transmission data because the break hereinafter referred to as break) of one modulation time cannot be determined from data received in a circuit on a prestage of the Fourier transformation circuit (window detecting portion 204 in FIG. 2). Ordinarily, for the known preamble signal contained in the transmission data, correlation in power level is obtained. In order to increase the accuracy of correlation value to be obtained here, calculation is necessary without reducing the bit width of each channel. For the reason, there is a problem that the scale of a circuit for detecting the correlation is increased.

BRIEF SUMMARY OF THE INVENTION

The present invention has been achieved in views of problems in the above described radio transmission of the multi-carrier signal and an object of the present invention is to enable demodulation by determining a break of one modulation unit with a simple structure or processing prior to Fourier transformation on the side receiving a signal to be transmitted as a multi-carrier signal.

According to a first invention, there is provided a multi-carrier signal transmission apparatus for transmitting a signal in which first information necessary for gaining synchronism of transmission signal is disposed at a predetermined interval in second information which is the other information, comprising: data arrangement means for arranging the first information and the second information; first modulation means for generating a transmission symbol stream by modulating data created by the data arrangement means; symbol generating means for expanding a transmission symbol stream generated by the first modulation means on frequency axis so as to generate the transmission symbol stream symmetrical on the frequency axis; and second modulation means for converting the transmission symbol stream symmetrical on the frequency axis generated on the symbol generating means by reverse Fourier transformation. Consequently, first information necessary for gaining synchronism is contained in transmission symbol disposed symmetrically with respect to a reference position on frequency axis. As a result, the side receiving a signal transmitted from this apparatus is capable of extracting only any one of real number portion and imaginary number portion of the first information.

According to a second invention, there is provided a multi-carrier signal transmission apparatus according to the first invention wherein the data arrangement means disposes the first information and the second information alternately.

Consequently, when self correlation of the first information is carried out in a reception circuit, a more highly accurate correlation value can be produced.

According to a third invention, there is provided a multi-carrier signal transmission apparatus according to the first invention wherein with a symbol at the reference frequency position of the transmission symbol stream as the center, the symbol generating means expands respective symbols of the transmission symbol stream other than that symbol symmetrically on the frequency axis.

Consequently, symbols are arranged symmetrically on the frequency axis centering on a frequency position which serves as reference like 0 kHz and the like, so that the symbols can be expanded symmetrically on the frequency axis favorably.

According to a fourth invention, there is provided a multi-carrier signal reception apparatus for receiving multi-carrier signal including first information necessary for gaining synchronism of transmission signal and second information, comprising: memory means for memorizing any one of a real number portion and an imaginary number portion in the first information; delay means for delaying a received symbol stream by a predetermined time; a filter portion for extracting the first information using a reception symbol stream delayed by the delay means and a reception symbol stream not delayed; a correlator for gaining correlation between an output of the filter portion and the first information of the real number portion or imaginary number portion memorized in the memory means; and determining means for detecting synchronism depending on a peak position of a correlation value of the correlator.

Consequently, when symbols disposed symmetrically with 0.9 respect to the reference position on the frequency axis are received, by gaining correlation between first information extracted from that received symbol and preliminarily prepared first information, only a correlation value of any one of the real number portion and the imaginary number portion is detected when its correlation is detected. Thus, as the first information which should be prepared preliminarily for detection of the correlation within the reception apparatus, only any one of the real number portion and the imaginary number portion has to be prepared. As a result, the amount of the first information prepared in the reception apparatus can be reduced correspondingly and a processing amount for detecting the correlation can be reduced, so that information for gaining synchronism contained in the received multi-carrier signal can be detected prior to Fourier transformation with simple structure and simple processing.

According to a fifth invention, there is provided a multi-carrier signal reception apparatus according to the fourth invention wherein when processing time of a single unit for Fourier-transforming the multi-carrier signal is a single modulation time, a predetermined time to be delayed by the delay means is set to ½ a single modulation time.

Consequently, only the first information necessary for gaining synchronism can be extracted easily from the transmission symbol in which the first information and the second information are arranged alternately.

According to a sixth invention, there is provided a multi-carrier signal transmission apparatus for transmitting first information necessary for gaining synchronism of transmission signal and second information which is the other information as the multi-carrier signal, comprising: first modulation means for generating a transmission symbol stream by the first information and a transmission symbol stream by the second information selectively; and symmetrical transmission symbol stream generating means in which a transmission symbol stream based on the first information generated by the first modulation means is the transmission symbol stream expanded symmetrically on frequency axis with respect to a predetermined frequency position.

Consequently, transmission of the transmission symbol stream composed of the first information necessary for gaining synchronism and transmission of the transmission symbol stream composed of the second information which is the other information can be carried out selectively. Thus, when transmitting an asynchronous packet, it is possible to transmit the symbol stream composed of the first information symmetrically on a reference frequency position at a head slot and then transmit just the symbol stream composed of the second information at a next slot, thereby enabling information necessary for gaining synchronism to be transmitted effectively.

According to a seventh invention, there is provided a multi-carrier signal transmission apparatus according to the sixth invention wherein with a symbol at the reference frequency position of the transmission symbol stream as the center, the first modulation means expands respective symbols of the transmission symbol stream other than that symbol symmetrically on the frequency axis.

Consequently, with a reference frequency position like 0 kHz as the center, symbols are arranged symmetrically on the frequency axis, so that the symbols can be expanded symmetrically on the frequency axis favorably.

According to an eighth invention, there is provided a multi-carrier signal reception apparatus for receiving the first information necessary for gaining synchronism of a transmission signal and second information which is the other information, comprising: memory means for memorizing the first information; correlator for gaining correlation between the received symbol stream and the first information of the real number portion or imaginary number portion memorized in the memory means; and determining means for detecting synchronism depending on a peak position of a correlation value of the correlator.

Consequently, when receiving the symbol stream composed of the first information, a correlation value is detected from only any one of the real number portion and the imaginary number portion contained in that reception symbol. Therefore, as the first information to be preliminarily prepared for detection of the correlation within the reception apparatus, only any one of the real number portion and the imaginary number portion has to be prepared, so that the amount of the first information prepared within the reception apparatus can be reduced correspondingly and further, the processing amount for detecting the correlation can be reduced. Thus, information for gaining synchronism contained in the received multi-carrier signal can be detected prior to Fourier transformation by simple structure and simple processing.

According to a ninth invention, there is provided a multi-carrier signal reception apparatus according to the eighth invention wherein the memory means memorizes only any one of the real number portion and the imaginary number portion in said first information.

Consequently, information for gaining synchronism contained in the reception symbol can be detected easily using storage information having a small information amount.

DETAILED DESCRIPTION

Best Mode for Carrying Out the Invention

Hereinafter, a first embodiment of the present invention will be described with reference to FIGS. 3-7.

Figure 3:
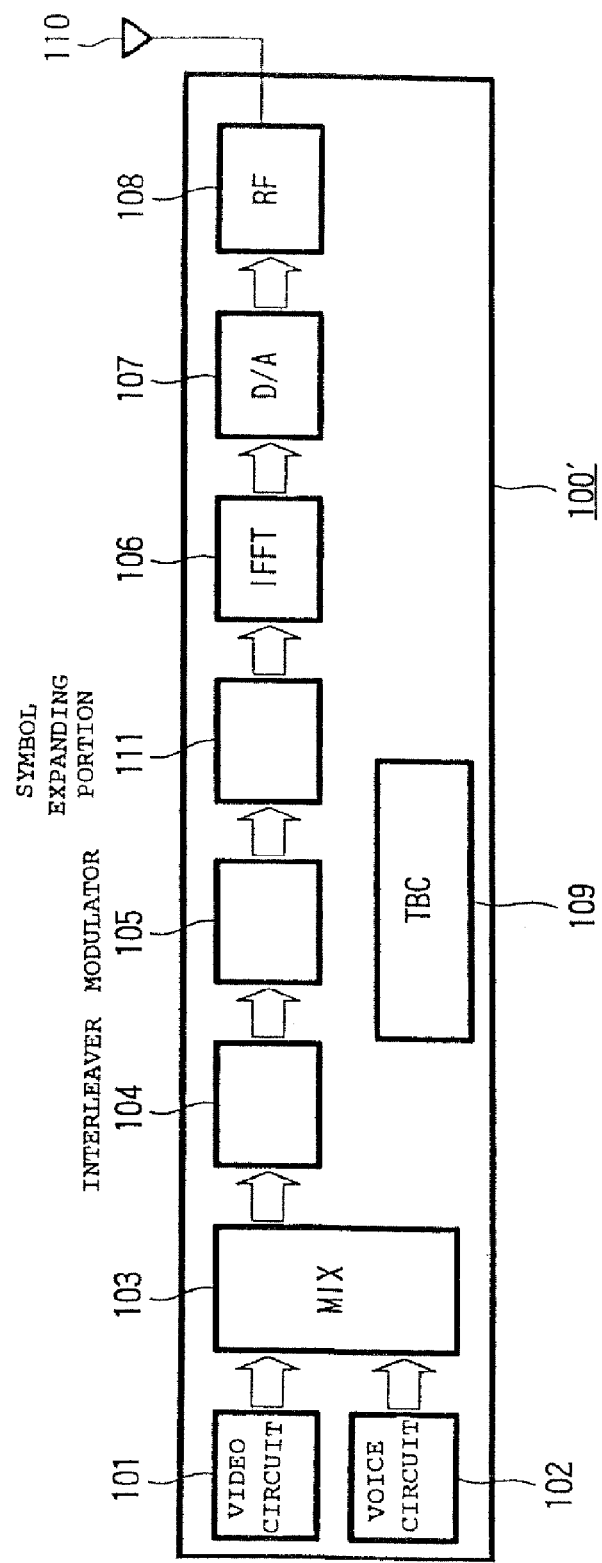
FIG. 3 is a block diagram showing an example of a transmission system according to a first embodiment of the present invention.

In this embodiment, the present invention is applied to a case of carrying out radio transmission of a multi-carrier signal. FIG. 3 shows an example of the structure of a transmission apparatus of this embodiment. Hereinafter, the structure will be described. A radio transmission apparatus 100' comprises a video circuit 101 and a voice circuit 102, and the respective circuits 101, 102 carry out processing for encoding an inputted video signal and voice signal. Video data outputted by the video circuit 101 and voice data outputted by the voice circuit 102 are supplied to a mixing circuit 103 so as to turn to single-system data. After that, this data is supplied to an interleaver 104, which carries out interleave processing in which bit series is diffused by changing an data arrangement. Data interleaved by the interleaver 104 is modulated by a modulator 105 for the purpose of transmission. This modulator 105 inserts a preamble signal into a bit series and then carries out DQPSK modulation (or modulation by other modulation methods such as QPSK, BPSK, 8PSK, QAM) as the primary modulation so as to obtain a symbol stream as modulation output.

Figure 4:
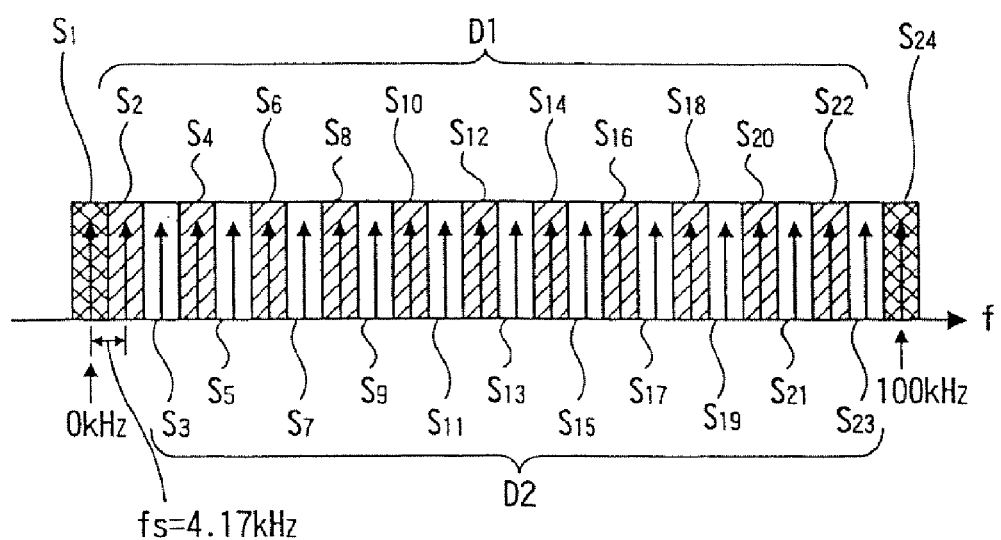
FIG. 4 is an explanatory diagram showing an example of a transmission symbol stream according to a first embodiment of the present invention.

FIG. 4 shows an example of the symbol stream outputted by the modulator 105. In FIG. 4, the frequency axis is indicated virtually in the form of an abscissa axis, in which 24 pieces of symbols are expressed in a unit. This unit of the symbol column is modulated to a multi-carrier signal by means of a circuit described later. In this structure, 24 pieces of symbols $S_1$-S24 are disposed at predetermined frequency intervals (fs=4.17 kHz) between 0 kHz and 100 kHz, while the symbols $S_1$, S24 (that is, a symbol located at 0 kHz and a symbol located at 100 kHz) located on both ends of the 24 symbols $S_1$-S24 serve for guard carriers so that they do not carry anything. Remaining 22 symbol $S_2$-$S_{23}$ are divided to symbols for use for transmitting first information and symbols for use for transmitting second information. The first information is a preamble signal. The second information is data desired to be transmitted actually (for example, data obtained by encoding the video signal or voice signal). In the meantime, a band from 0 kHz to 100 kHz is called a base band range.

As for disposition of the first information symbol and the second information symbol, the first information symbol and the second information symbol are disposed alternately. That is, as shown in FIG. 4, the symbols $S_2$, $S_4$, S6, S8, S10, S12, S14, S16, S18, S20, S22 are disposed as symbols for transmitting (modulating) the first information $S_1$ and the symbols $S_3$, $S_5$, $S_7$, $S_9$, $S_{11}$, $S_{13}$, $S_{15}$, $S_{17}$, $S_{19}$, $S_{21}$, $S_{23}$ are disposed as symbols for transmitting (modulating) the second information D2. The symbol column shown in FIG. 4 is a symbol column to be processed in a single modulation time at the time of modulation to multi-carrier signals and here, called a symbol column in the unit of a single modulation.

According to this embodiment, data modulated primarily by the modulator 105 is supplied to a symbol expanding portion 111. This symbol expanding portion 111 expands only the first information of the symbol column in the unit of a single modulation symmetrically on the frequency axis. That is, when the symbol column disposed from 0 kHz to 100 kHz virtually on the frequency axis is inputted to the symbol expanding portion 111 as shown in FIG. 4, the symbols are expanded symmetrically on the frequency axis with the position of 0 kHz as a reference frequency position so that this reference position serves as a central position.

Figure 5:
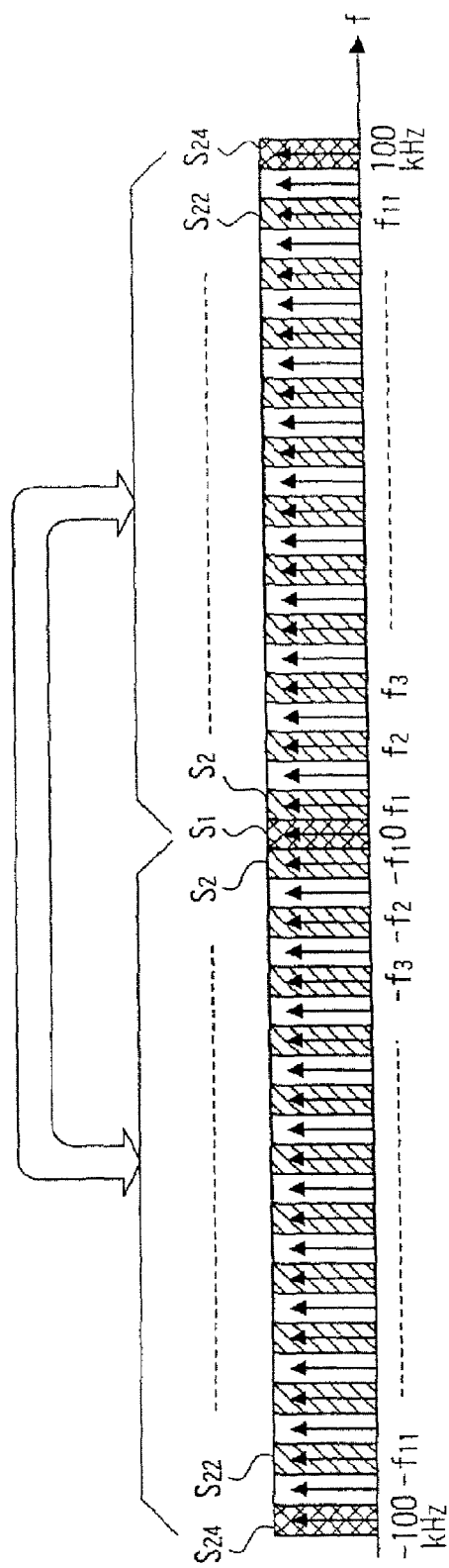
FIG. 5 is an explanatory diagram showing an example of the transmission symbol stream expanded according to the first embodiment of the present invention.

FIG. 5 is a diagram showing an expanded state. With the symbol $S_1$ disposed virtually at 0 kHz which is a reference position acting as a guard carrier in the center, the symbols $S_2$-$S_{24}$ are expanded symmetrically vertically on the frequency axis (to the right and left in a state shown in FIG. 5), such that the symbols are disposed at a predetermined frequency interval fs in a range from -100 kHz to 100 kHz. Therefore, in the symbol developing portion 111, the symbol $S_1$ at the center position (reference position) is kept as it is while as of the other symbols $S_2$-$S_{24}$, even symbols $S_2$, $S_4$, $S_6$, $S_8$, $S_{22}$ are expanded in an opposite direction. That is, assuming that the frequency position of the symbol in which the first information is disposed in the order of the frequency from -100 kHz is -$f_{11}$, -$f_{10}$, -$f_9$, . . . -$f_1$, $f_1$, . . . $f_9$, $f_{10}$, $f_{11}$, as the symbols at frequency positions -$f_1$--$f_{11}$ lower than the reference position (0 Hz), the symbols $S_2$, $S_4$, . . . $S_{22}$ are disposed in order from a higher frequency position. As the symbols at frequency positions f1-f11 higher than the reference position, the symbols $S_2$, $S_4$, . . . $S_{22}$ are disposed in order from a lower frequency position, so that they are inverted in terms of the right and left direction with 0 Hz as a border on the frequency axis.

Returning to the description of FIG. 3, a symbol stream outputted from the symbol developing portion 111 having such an arrangement is supplied to a reverse fast Fourier transformation circuit (IFFT circuit) 106 and in a secondary modulation, data disposed on a time axis is subjected to reverse Fourier transformation processing so as to convert it to a data arrangement on the frequency axis by arithmetic processing of reverse Fourier transformation. Further, the window application processing for multiplying this result by window data is carried out. If the reverse Fourier transformation processing is carried out by this IFFT circuit 106, the transmission symbol stream disposed virtually on the frequency axis up to here is averaged on a time axis so that it becomes transmission series. Data of a single modulation unit processed in a single modulation time in this IFFT circuit 106 is a symbol column disposed virtually in a range from -100 kHz to 100 kHz as shown in FIG. 5.

An output of the IFFT circuit 106 is supplied to a digital/analog converter 107 and converted to an analog signal. That converted analog signal is supplied to a high-frequency portion (RF portion) 108 so as to carry out high frequency processing such as filtering and frequency conversion to obtain a transmission signal of a predetermined transmission channel. After that, it is transmitted by radio from an antenna 110. Processing timing in each circuit in the radio transmission apparatus 100' is controlled by a time base controller (TBC) 109.

Figure 1:
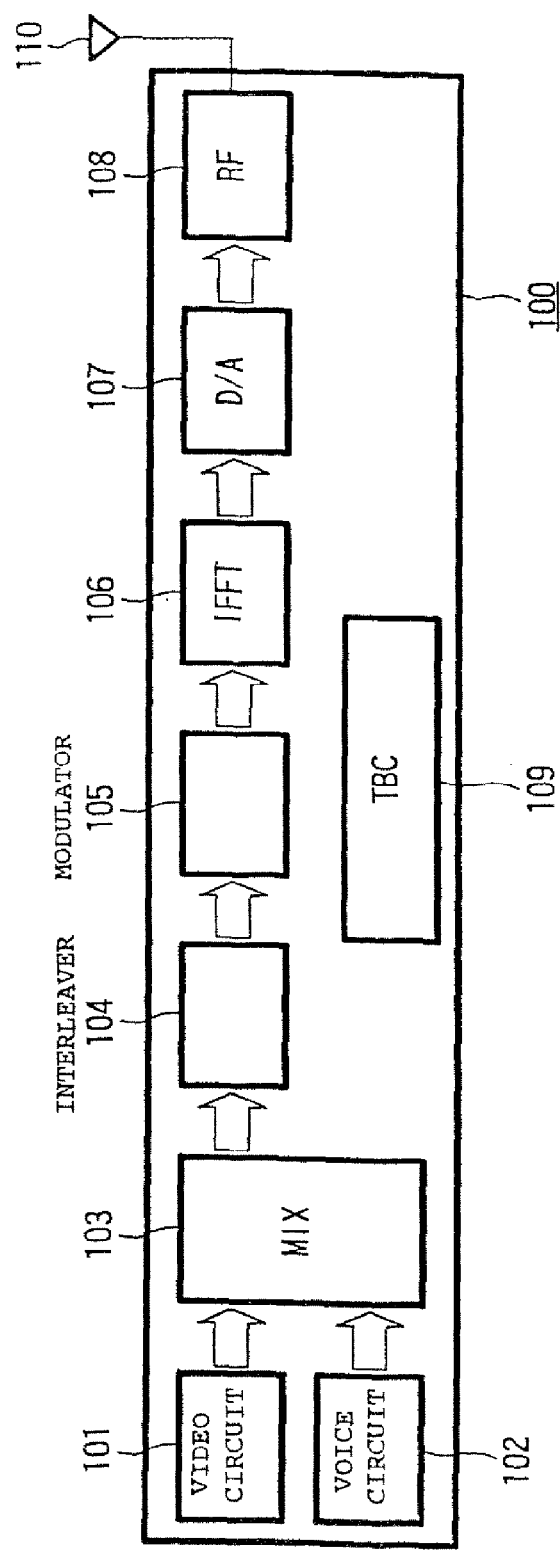
FIG. 1 is a block diagram showing an example of a transmission system for a multi-carrier signal.
Figure 2:
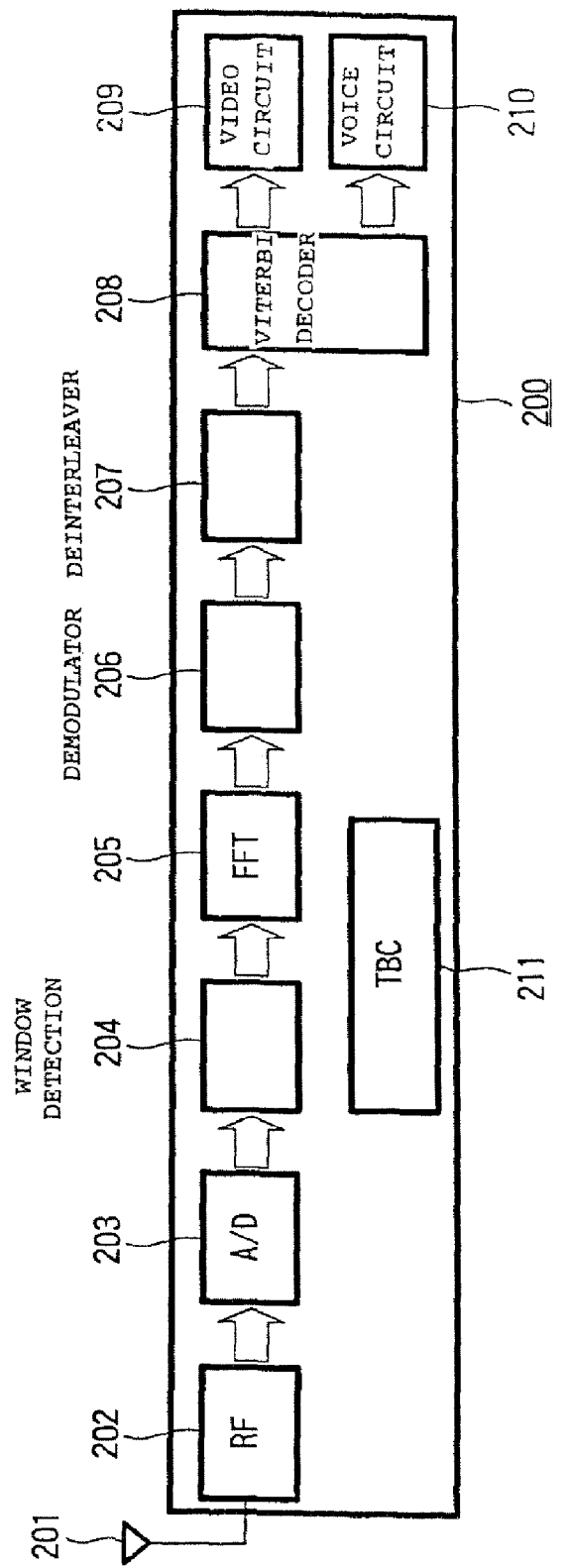
FIG. 2 is a block diagram showing an example of a reception system for the multi-carrier signal.

Next, a radio receiving apparatus for receiving a multi-carrier signal transmitted by radio under the structure shown in FIG. 3 will be described. According to this embodiment, the basic structure for conducting receiving processing is the same as the structure of the radio receiving apparatus 200 shown in FIG. 2. The multi-carrier signal received here is subjected to a processing for converting symbols disposed on the frequency axis by the fast Fourier transformation circuit (FFT circuit) to symbols on the time axis. A prestage circuit (window detecting portion 204 shown in FIG. 2) for transformation processing by the FFT circuit determines a break of reception data and the determined break data is supplied to the FFT circuit (or circuit for controlling processing timing in the FFT circuit).

Figure 6:
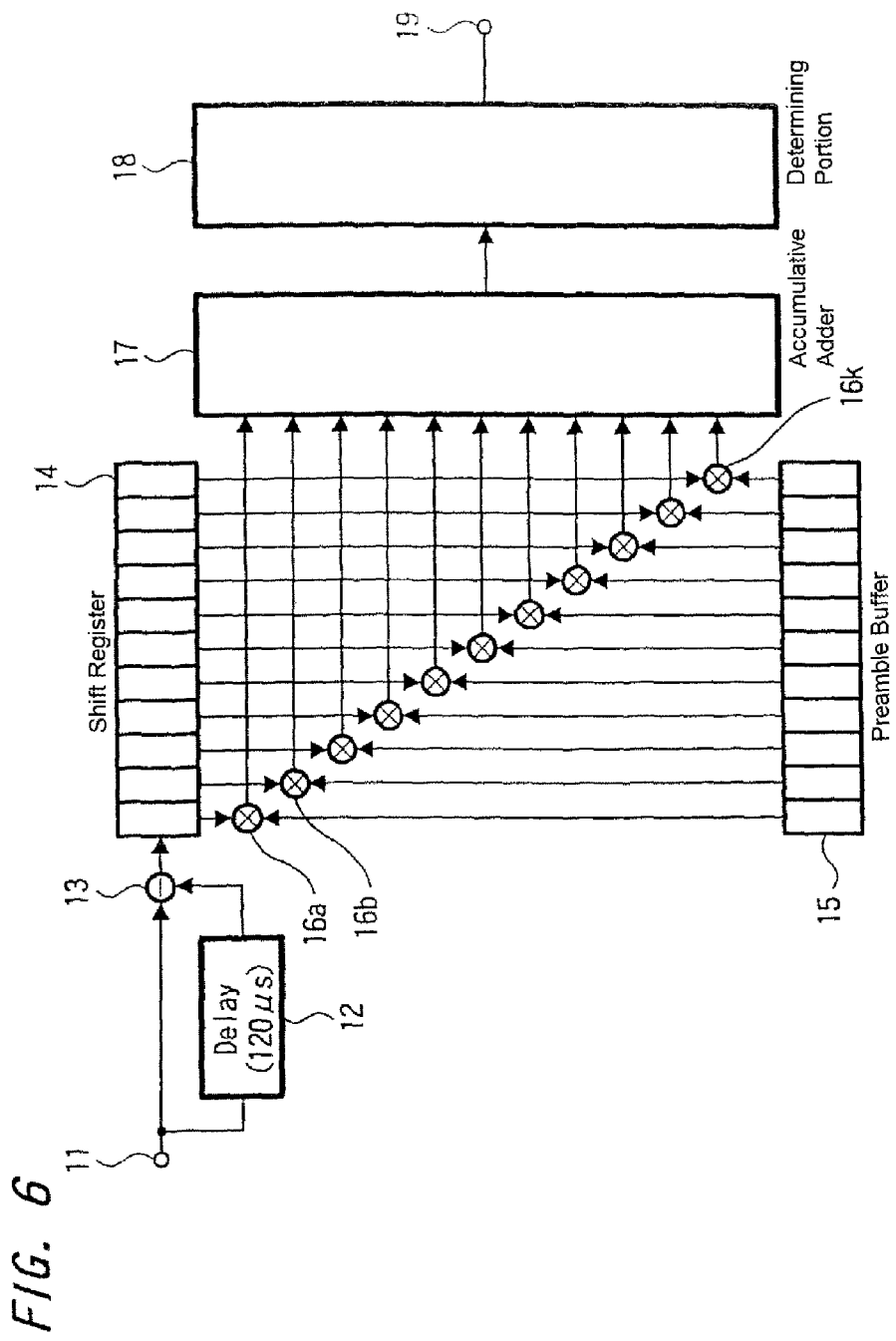
FIG. 6 is a block diagram showing an example of a preamble signal detecting structure according to a first embodiment of the present invention.

According to this embodiment, to determine a break of this reception data, a detection circuit having a structure shown in FIG. 6 is composed within a circuit disposed at a prestage of the FFT circuit so as to detect a preamble signal contained in the reception data. A circuit shown in FIG. 6 is a circuit to be incorporated in the window detecting portion 204 in the receiving apparatus shown in FIG. 2. If the reception series is obtained by an input terminal 11, a signal in which this reception series is delayed by a delay circuit 12 and a signal in which it is not delayed (that is, just a signal obtained in the input terminal 11) are supplied to a subtractor 13 so as to carry out subtraction processing. A delay circuit 12 is a circuit for delaying the single modulation time of the reception series by only ½. Here, the single modulation time is assumed to be 240 .mu.seconds and a delay processing is carried out by the delay circuit 12 for 120 .mu.seconds.

Carrying out of subtraction processing for the signal delayed by ½ modulation time and the not delayed signal by means of the subtractor 13 functions as a comb filter for extracting only the preamble signal from signal transmitted with the state shown in FIG. 5. The delay time in the delay circuit 12 composing this filter is set based on the disposition of the first information symbol and the second information symbol.

The preamble signal extracted by the subtractor 13 is supplied to a shift register 14. The shift register 14 is a register in which 11-symbol data are set. A preamble buffer 15 stores the preamble data of the 11 symbols preliminarily. Correlation between data set in the shift register 14 and data stored preliminarily in the preamble buffer 15 is obtained by individual multipliers 16a, 16b, . . . 16n for each symbol value. According to this embodiment, transmitted symbol data is symbol data subjected to DQPSK modulation. The DQPSK modulated symbol data is composed of I channel (real number portion which is an in-phase component of an orthogonal modulated wave) and Q channel (imaginary number portion which is an orthogonal component of the orthogonal modulated wave). Data of only the I channel which is a real number portion is stored in the preamble buffer 15, so that only data of the I channel is compared in the multipliers 16a, 16b, . . . 16k.

Then, output of the correlation value of the respective multipliers 16a-16k is supplied to an accumulative adder 17, in which an electric power level corresponding to 11 symbols are added accumulatedly and output of the added values is supplied to a determining portion 18. The determining portion 18 carries out a processing for determining whether the electric power level obtained by accumulated addition is higher or lower than a threshold level set preliminarily. If it is determined that it is higher than the threshold level, its determining output is supplied from a terminal 19 to a reception timing control means (circuit corresponding to a time base controller 211 of FIG. 2) and then, processing timing in the FFT circuit and the like is controlled based on the determined timing.

Here, a principle that the preamble signal can be detected by detecting correlation by means of a circuit shown in FIG. 6 will be described. Because modulation processing carried out on a received signal at this time, namely modulation in the modulator 105 within the radio transmission apparatus 100 is DQPSK modulation, it is data indicated by a position on a circle on the orthogonal coordinate axes formed by intersecting the I channel and the Q channel. In the modulator 105 on the transmission side, as the second information shown in FIG. 4, any one of these four points is selected. The first information is absolutely modulated such that all are at the same phase positions.

Assuming that the basic waveform of each subcarrier in the I channel is cos(2.pi.ft) and the basic waveform of each subcarrier in the Q channel is sin(2.pi.ft), of two outputs (I channel and Q channel), transmission power on one side (for example, I channel) is doubled because the component of the frequency fn and the component of the frequency –fn (for example, component of the frequency f1 and component of the frequency –f1 in FIG. 5) strengthen each other in the output of the high frequency portion 108 of the radio transmission apparatus 100'. If this is expressed by an equation, it can be expressed as follows.

$$I \text{ component}=\Sigma[\cos(2.pi.ft)+\cos\{2.pi.(-fn)t\}]$$
$$=2\Sigma[\cos(2.pi.ft)] \quad [1]$$

On the other hand, in transmission power in the Q channel, its plus component and minus component kill each other so that the transmission power becomes 0. If this is expressed by an equation, it can be expressed as follows.

$$Q \text{ component}=\Sigma[\sin(2.pi.ft)+\sin\{2.pi.(-fn)t\}] \quad [2]$$

Figure 7A:
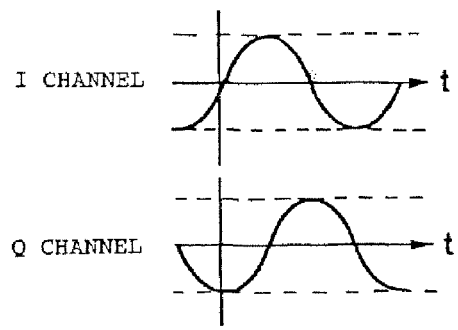
FIGS. 7A and 7B are waveform diagrams showing an example of waveforms in I channel and Q channel of preamble contained in an expanded transmission symbol stream.
Figure 7B:
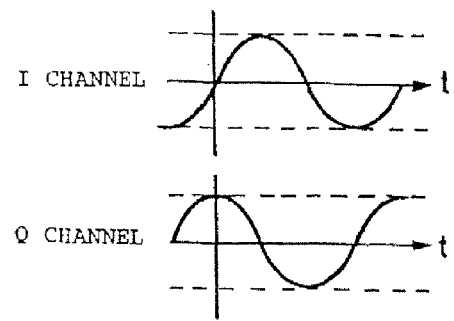

This is expressed by a waveform diagram in FIG. 7. An example of a carrier in the I channel of a subcarrier at a position –f1 shown in FIG. 5 is shown in FIG. 7A and a carrier in the Q channel of a subcarrier in the Q channel at a position f1 shown in FIG. 5 is shown in FIG. 7B. By adding the waveforms shown in FIGS. 7A, 7B for each channel, it is evident that the levels in the I channel strengthen each other while they kill each other in the Q channel. Thus, with the structure shown in FIG. 6, by memorizing only the preamble signal of one channel (I channel here) in the preamble buffer 15 and then obtaining correlation in reception power of the preamble signal, the preamble signal can be detected accurately.

If comparing a processing at the detection circuit of FIG. 6 with a processing at the conventionally same preamble signal detecting circuit, the output of a filter (circuit corresponding to the subtractor 13 shown in FIG. 6) for extracting the preamble signal is expressed by A+jB where the value of the real number portion (I channel) is A while the value of the imaginary number portion (Q channel) is jB. On the other hand, when the real number value C and the imaginary number value jD of the preamble signal are memorized in the preamble buffer, arithmetic operation of this memorized value C+jD and the filter output value A+jB is expressed by a following equation.

$$(A+jB)*(C+jD)=(AC-BD)+j(AD+BC) \quad [3]$$

Although the arithmetic operation of the equation [3] is a processing in the conventional detecting circuit, in the detecting circuit of this embodiment, memorized data in the preamble buffer 15 may be C alone. If correlation detecting processing is expressed, it is expressed by a following equation.

$$(A+jB)*C=AC+jBC \quad [4]$$

Therefore, it is possible to omit two multiplication processing and two addition/subtraction processing for each preamble of a symbol. In the signal structure described up to now, because there are provided 11 symbols of the preamble signals are provided, the multiplication processing of 22 pieces and addition/subtraction processing of 22 pieces can be omitted. Consequently, the structure of the preamble signal detecting circuit within the reception transmission can be simplified correspondingly. Further, the amount of storage data in the preamble buffer within the detecting circuit can be also reduced. When calculating correlation value in the detecting circuit, although there may occur an error more frequently in a determination result of the determining portion 18 as the quantity of valid bits is reduced more, under the processing structure of this embodiment, the preamble signal can be detected accurately even if the quantity of the valid bits is reduced, because the reception power is detected at a high level.

In the meantime, the concrete structure of a signal in a channel described in this embodiment is not restricted to the above described example. That is, the quantity of carriers, application band width, subcarrier interval and quantity of preamble signals may be of various values depending on the transmission data and application purpose. As for processing for detecting the preamble signal in the reception apparatus, although in the detecting circuit shown in FIG. 6, the processing for detecting correlation is carried out with a hardware circuit, such correlation detecting processing may be carried out with software.

Further, although the subtractor 13 shown in FIG. 6 is employed as a circuit composing the comb filter within the preamble signal detecting circuit, it may be constructed with another circuit such as an adder so as to function as a filter.

Next, a second embodiment of the present invention will be described with reference to FIGS. 8-12.

Figure 8:
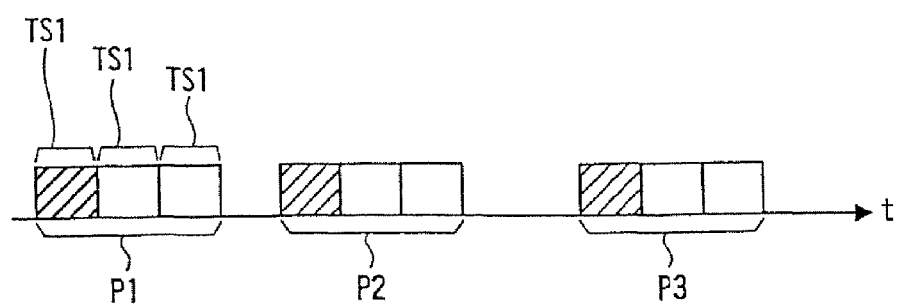
FIG. 8 is an explanatory diagram showing an example of a transmission state according to a second embodiment of the present invention.

In this embodiment also, the present invention is applied to a case for radio transmission of the multi-carrier signal. The basic structures of its transmission apparatus and reception apparatus are the same as those described in the first embodiment. After the transmission symbol stream generated by the primary modulator at the time of transmission is expanded in the symbol expanding portion, it is converted to the multi-carrier signal by means of the IFFT circuit (reverse fast Fourier transformation circuit). This embodiment is an example suitable for carrying out packet communication such as ATM (Asynchronous Transfer Mode) or the like. That is, as shown in FIG. 8, packets P1, P2, P3 composed of time slots TS1, TS2, TS3 are transmitted as required. Here, a time slot has the length of a modulation time.

Processing capacity of the IFFT circuit provided in the transmission apparatus is equal to capacity capable of processing signals (subcarrier interval fs=4.17 kHz) of −200 kHz-200 kHz in terms of base band and when the width of 100 kHz is assumed to be a channel, it comes that processing capacity corresponding to four channels is provided.

At the time slot TS1 at the head of each packets P1, P2, P3, the preamble signal is sent and then, at the second and third time slots, other signals (signal corresponding to the second information in the first embodiment) are sent.

Figure 9:
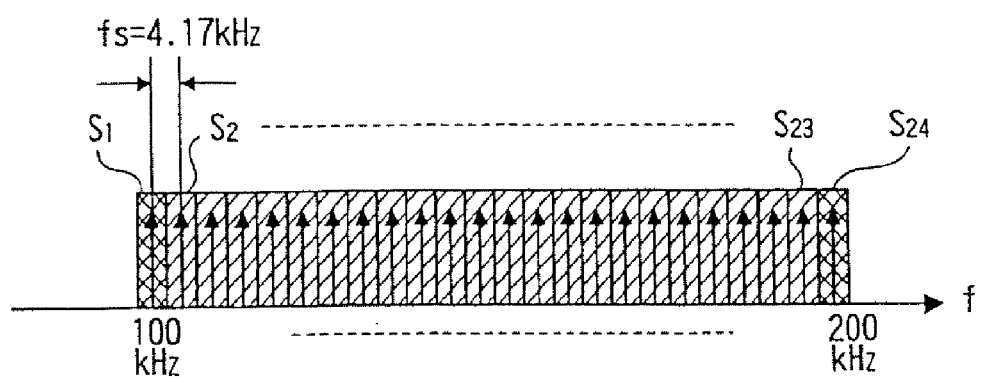
FIG. 9 is an explanatory diagram showing an example of a transmission symbol stream according to a second embodiment of the present invention.

According to this embodiment, the transmission symbol stream primarily modulated by DQPSK modulation in the modulator 105 within the transmission apparatus has the structure shown in FIG. 9. That is, when 24 pieces of symbols S.sub.1-S.sub.24 are disposed virtually on the frequency axis at 4.17 kHz, as for the frequency position, the frequency position of the symbol S.sub.1 is 100 kHz while the frequency position of the symbol S.sub.24 is 200 kHz. In this example also, symbols S.sub.1, S.sub.24 (that is, symbol located at 100 kHz and symbol located at 200 kHz) on both ends of 24 symbols S.sub.1-S.sub.24 serve for guard carriers, so that actually anything is not transmitted. Remaining 22 symbols S.sub.2-S.sub.23 are symbols for use for transmitting the first information (that is, preamble signal) through the head time slot TS1.

Figure 10:
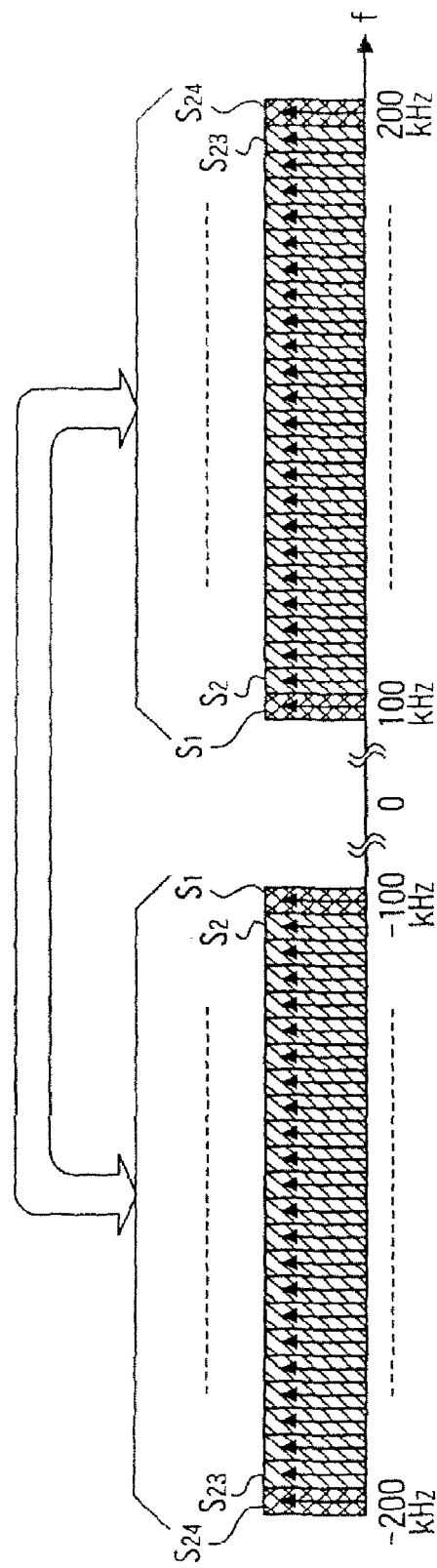
FIG. 10 is an explanatory diagram showing an example of the transmission symbol stream expanded according to the second embodiment of the present invention.

Then, the preamble signal having the structure shown in FIG. 9 is expanded by the symbol expanding portion. At the time of expansion, with 0 kHz as a reference position (that is, central position), processing for expanding symmetrically on the frequency axis is carried out. FIG. 10 is a diagram showing an example of symbols to be expanded in this case. As shown in the same Figure, the 24 symbols S.sub.1-S.sub.24 disposed virtually from 100 kHz to 200 kHz are disposed from −200 kHz to −100 kHz. Because they are disposed symmetrically with respect to 0 kHz, the arrangements of the symbols are reverse to each other.

Such expansion in the symbol expanding portion is carried out in only the time slot TS1 for transmitting the preamble signal which is information required to be determined before decoding in this example and symbols in a time slot period for transmitting other information (second information) are not expanded. Then, the symbol stream processed in this way is supplied to the IFFT circuit and subjected to reverse Fourier transformation processing in which a time axis is converted to a frequency axis for every symbol in the modulation unit. A transformation output of the IFFT circuit is supplied to a high-frequency portion and transmitted by radio in a predetermined transmission frequency band.

As a result of such transmission, only the I channel component of the preamble signal is doubled as compared to a case where the transmission power level is not subjected to expansion processing. A principle that the transmission power level doubles is the same as the transmission principle described in the first embodiment and therefore, a description thereof is omitted.

Next, a radio receiving apparatus for receiving a signal transmitted in this way will be described. The basic structure of the reception apparatus is the same as the reception apparatus described in the first embodiment. This embodiment has a different structure for detecting the preamble signal contained in a reception signal. The FFT circuit for transforming the multi-carrier signal is provided with a processing capacity corresponding to four channels like the IFFT circuit provided in the transmission apparatus.

Figure 11:
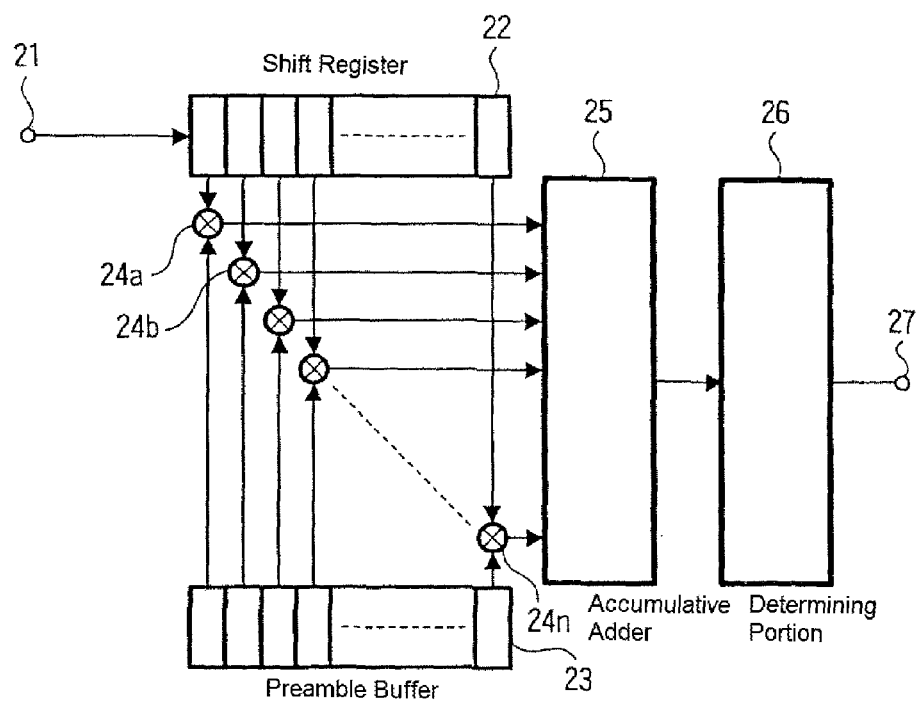
FIG. 11 is a block diagram showing an example of a preamble signal detecting structure according to the second embodiment of the present invention.

FIG. 11 shows the structure of the preamble signal detecting circuit of a reception apparatus of this embodiment. Hereinafter, the structure thereof will be described. If a reception column is received by an input terminal 21, this reception column is supplied to a shift register 22. The shift register 22 is a register in which data of 22 symbols is set. The preamble buffer 23 stores preamble data of 22 symbols preliminarily (FIG. 11 is a diagram in which part thereof is omitted and the registers and buffers are not expressed with 22 stages).

Then, correlation between data set in the shift register 22 and data preliminarily accumulated in the preamble buffer 23 is obtained by individual multipliers 24a, 24b, . . . 24n for each symbol. According to this embodiment, transmitted symbol data is symbol data subjected to DQPSK modulation. The DQPSK modulated symbol data is composed of I channel (real number portion which is an in-phase component of an orthogonal modulated wave) and Q channel (imaginary number portion which is an orthogonal component of the orthogonal modulated wave). Data of only the I channel which is a real number portion is stored in the preamble buffer 23, so that only data of the I channel is compared in the multipliers 24a, 24b, . . . 24n.

Then, output of the correlation value of the respective multipliers 24a-24n is supplied to an accumulation adder 25, in which electric power level corresponding to 22 symbols are added accumulatedly and an output of the added values is supplied to a determining portion 26. The determining portion 26 carries out a processing for determining whether the electric power level obtained by accumulated addition is higher or lower than a threshold level set preliminarily. If it is determined that it is higher than the threshold level, its determining output is supplied from a terminal 27 to a reception timing control means (circuit corresponding to a time base controller 211 of FIG. 2) and then, processing timing in the FFT circuit and the like are controlled based on the determined timing. When another time slot in the same packet is subjected to transformation, the transformation processing is carried out cyclically in the period of the modulation time from that determined timing. The principle that correlation detection is carried out with the structure shown in FIG. 11 is the same as that mentioned about the equation [4] in the first embodiment.

By such reception processing, a break of the single modulation time can be determined from reception data prior to Fourier transformation with a simple structure only by determining the reception power of any one of the real number portion and imaginary number portion composing the reception symbol in the same method as the processing of the first embodiment, accurate determination is enabled, so that the circuit scale can be reduced and the memory capacity for the preamble signal prepared for comparison can be reduced.

Further, because in this embodiment, a time slot composed of data in the modulation unit is composed of all the preamble signals (except the guard carriers), a filter portion for extracting only the preamble signals within the preamble signal detecting circuit is not necessary in the preamble signal detecting circuit shown in FIG. 11. That is, because other signals than the preamble signals are contained in a signal in the modulation unit in case of the detecting circuit explained in the above described first embodiment, a filter comprised of the delay circuit 12 and the subtractor 13 is necessary as shown in FIG. 6 and however, according to this embodiment, such a filter becomes unnecessary, thereby the circuit structure being simplified correspondingly.

A concrete configuration of a signal in a channel described in this embodiment is not limited to the above described example. The number of carriers, application band width, subcarrier interval and number of preamble signals may be of various values depending on the transmission data and application purpose. Further, the number of the time slots in a packet and the base band for use are not limited to the above described example. In case of synchronous communication carried out continuously unlike the above described asynchronous communication, any time slot period may be a time slot in which the preamble signals described in this embodiment are disposed.

Further, it is permissible to change the base band for use upon transmitting the preamble signal depending on a communication state. For example, it is permissible that, when the transmission path state is good, the base band of the time slot for transmitting the preamble signal is in a range of −200 kHz to 200 kHz and when the transmission path state is not good, the base band of the time slot for transmitting the preamble signal is in a range of −100 kHz to 100 kHz. In this case, the detecting circuit for the preamble signal in the reception apparatus may be so constructed to correspond to both the signals.

Figure 12:
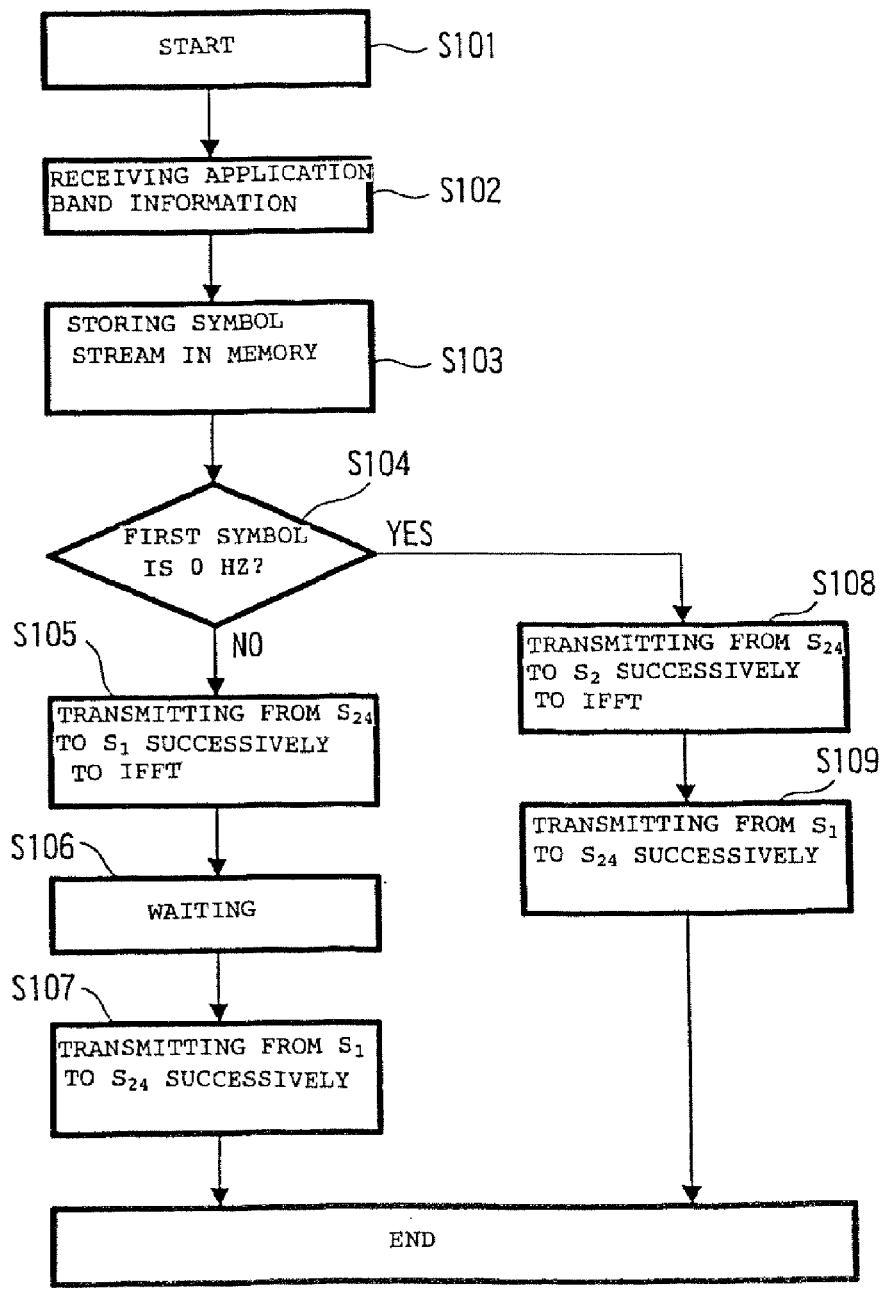
FIG. 12 is a flow chart showing an example of preamble signal detecting processing according to the second embodiment of the present invention.

If the base band of the time slot for transmitting the preamble signal is changed, this can be treated by carrying out a processing shown in FIG. 12, for example, in the symbol expanding portion in the transmission apparatus. That is, after the transmission processing is started (step S101), application band information is obtained from a time base controller in this transmission apparatus (step S102). Next, the symbol stream corresponding to a single modulation time to be transmitted is accumulated in the buffer memory (step S103). Then, it is determined whether or not the frequency of a first symbol position (guard carrier in the above described example) of the transmission symbol stream is 0 kHz (step S104). This determination can be carried out depending on the application band information obtained in, for example, step S102.

If it is determined that the frequency of the first symbol position is 0 kHz in this determination, the symbol S.sub.24 to the symbol S.sub.2 are transmitted successively to the IFFT circuit (step S108). After that, the symbol S.sub.1 to the symbol S.sub.24 are transmitted successively to the IFFT circuit (step S109). Then, with the symbol S.sub.1 set at 0 kHz, the multi-carrier signal in which symbols thereof are expanded symmetrically in a range of −100 kHz to 100 kHz is generated by reverse Fourier transformation and transmitted, and the processing in this time slot is terminated (step S110).

Further, if it is determined that the frequency of the first symbol position is not 0 kHz in step S104, the symbol S.sub.24 to the symbol S.sub.1 are transmitted successively to the IFFT circuit (step S105) and after waiting in time equivalent to transmission time for about two channels (or transmitting symbol stream corresponding to its application band)(step S106), the symbol S.sub.1 to the symbol S.sub.24 are transmitted successively to the IFFT circuit (step S107). A multi-carrier signal in which symbols thereof are expanded symmetrically in a range of −200 kHz to 200 kHz as shown in FIG. 10 is generated by reverse Fourier transformation and transmitted, and then, the processing in this time slot is terminated (step S1110).

In the meantime, the reason why the symbols to be transmitted to the IFFT circuit in step S108 are up to the symbol S.sub.2 while the symbol S.sub.1 is not to be transmitted when symbols are expanded symmetrically in a range of −100 kHz to 100 kHz, is to have the respective symbols to be disposed symmetrically with respect to the position of 0 Hz so that the symbols located at the respective symmetrical positions kill each other.

Although only the slot for transmitting the preamble signals is expanded symmetrically for transmission according to this embodiment, it is permissible to expand symbols symmetrically for transmission in a slot for transmitting other information. Further, information to be disposed in a slot for transmitting other information than the preamble signal may be provided with error correction data before reverse Fourier transformation is carried out. In this case, after Fourier transformation is carried out on the side of the reception apparatus, error correction processing based on error correction data is carried out.

In the processing for detecting the preamble signal within the reception apparatus, its correlation detection processing may be carried out with software as well as with a hardware circuit shown in FIG. 11.

The invention claimed is:
1. A multi-carrier signal transmission apparatus for transmitting a transmission symbol stream including a modulated arrangement of information for synchronizing a transmission signal and data information as a multi-carrier signal in a radio transmission system, the apparatus comprising:
 a processing device and a memory including instructions which, when executed by the processing device, control selectively expanding, from a modulated symbol stream of the information for synchronizing the transmission signal and the data information, the information for synchronizing the transmission signal symmetrically on a frequency axis, to obtain an expanded transmission symbol stream; and
 transmitting an output transmission signal corresponding to the expanded transmission symbol stream.
2. The multi-carrier signal transmission apparatus according to claim 1, wherein the transmission symbol stream is expanded on the frequency axis by generating a complex conjugate value of at least one part of the information for synchronizing the transmission signal symmetrically on the frequency axis.

3. The multi-carrier signal transmission apparatus according to claim 2, wherein the transmission symbol stream is expanded symmetrically about a reference position on the frequency axis.

4. A multi-carrier signal transmission method for transmitting a transmission symbol stream including a modulated arrangement of information for synchronizing a transmission signal and data information as a multi-carrier signal in a radio transmission system, the method comprising:
selectively expanding, by a circuit, from a modulated symbol stream of the information for synchronizing the transmission signal and the data information, the information for synchronizing the transmission signal symmetrically on a frequency axis, to obtain an expanded transmission symbol stream; and
transmitting an output transmission signal corresponding to the expanded transmission symbol stream.

5. The multi-carrier signal transmission method according to claim 4, wherein the expanding step expands the transmission symbol stream on the frequency axis by generating a complex conjugate value of at least one part of the information for synchronizing the transmission signal symmetrically on the frequency axis.

6. The multi-carrier signal transmission method according to claim 5, wherein the transmission symbol stream is expanded symmetrically about a reference position on the frequency axis.

7. A multi-carrier signal transmission apparatus for transmitting, in a radio transmission system, a signal in which first information for synchronizing a transmission signal is disposed at a predetermined interval in second information, said apparatus comprising:
a processing device and a memory including instructions which, when executed by the processing device, control
arranging said first information and said second information;
generating a modulated transmission symbol stream of the first information and said second information by modulating said first information and said second information;
selectively expanding, from said modulated transmission symbol stream, the first information on a frequency axis to generate a symmetrical transmission symbol stream that is symmetrical on said frequency axis;
converting said symmetrical transmission symbol stream by performing reverse Fourier transformation, to obtain a converted symmetrical transmission symbol stream
transmitting an output transmission signal corresponding to the converted symmetrical transmission symbol stream.

8. The multi-carrier signal transmission apparatus according to claim 7, wherein said first information and said second information are arranged disposed alternately.

9. The multi-carrier signal transmission apparatus according to claim 7, wherein using a center symbol at a reference frequency position of said modulated transmission symbol stream as a center, symbols of said modulated transmission symbol stream other than said center symbol symmetrically on said frequency axis are expanded.

10. A multi-carrier signal reception apparatus for receiving a multi-carrier signal including first information for synchronizing a transmission signal and second information, said apparatus comprising:
memory means for storing one of a real number portion and an imaginary number portion in said first information;
delay means for delaying a received symbol stream by a predetermined time period; and
circuitry configured for:
extracting said first information using said reception symbol stream delayed by said delay means and a reception symbol stream that is not delayed to obtain an output;
correlating the output and one of said first information of said real number portion and said imaginary number portion stored in said memory means to obtain a correlation value; and
detecting a synchronism depending on a peak position of the correlation value,
in which the circuitry is a prestage of a Fourier transform circuit to which digital data corresponding to the reception symbol stream is supplied with the synchronism detected, the digital data being supplied to the Fourier transform circuit through the circuitry.

11. The multi-carrier signal reception apparatus according to claim 10, wherein when a processing time of a single unit for Fourier-transforming the multi-carrier signal is a single modulation time, said predetermined time period used by said delay means is set at ½ said single modulation time.

12. A multi-carrier signal transmission apparatus for transmitting first information for synchronizing a transmission signal and second information as a multi-carrier signal in a radio transmission system, said apparatus comprising:
modulation means for generating a modulated transmission symbol stream by selectively generating a first transmission symbol stream by said first information and a second transmission symbol stream by said second information;
symmetrical transmission symbol stream generating means for generating, from the modulated transmission symbol stream including the first and second transmission symbol streams, a symmetrical transmission symbol stream obtained by selectively expanding, from the modulated transmission symbol stream, symbols of the first information symmetrically on a frequency axis with a predetermined frequency position as a reference; and
a transmitting means for transmitting an output transmission signal corresponding to the symmetrical transmission symbol stream.

13. The multi-carrier signal transmission apparatus according to claim 12, wherein using a center symbol at said reference frequency position of said modulated transmission symbol stream as a center said modulation means expands symbols of said modulated transmission symbol stream other than said center symbol symmetrically on said frequency axis.

14. A multi-carrier signal transmission apparatus for transmitting preamble information for synchronizing a transmission signal and data information as a multi-carrier signal in a radio transmission system, the apparatus comprising:
a processing device and a memory including instructions which, when executed by the processing device, control
generating a transmission symbol stream by modulating an arrangement of said preamble information and said data;
selectively expanding, from said transmission symbol stream, said preamble information on a frequency axis by generating the transmission symbol stream of a complex conjugate value, symmetrically on said frequency axis, to obtain an expanded transmission symbol stream; and transmitting an output transmission signal corresponding to the expanded symbol stream.

15. The multi-carrier signal transmission apparatus according to claim 14, wherein said transmission symbol stream is expanded on said frequency axis symmetrically about position.

16. A multi-carrier signal transmission apparatus for transmitting preamble information for synchronizing a transmission signal and data information as a multi-carrier signal in a radio transmission system, the apparatus comprising:
   a processing device and a memory including instructions which, when executed by the processing device, control
      generating a transmission symbol stream by modulating an arrangement of said preamble information and said data information; and
      selectively expanding, from said transmission symbol stream, said preamble information on a frequency axis by generating the transmission symbol stream of a complex conjugate value, symmetrically on the frequency axis, to obtain an expanded transmission symbol stream; and
      transmitting an output transmission signal corresponding to the expanded transmission symbol stream.

17. The multi-carrier signal transmission apparatus according to claim 16, wherein the transmission symbol stream is expanded on said frequency axis symmetrically about position.

18. A multi-carrier signal transmission apparatus for transmitting a transmission stream including at least preamble information for synchronizing a transmission signal and data information as a multi-carrier signal in a radio transmission system, comprising:
   modulation means for generating a transmission symbol stream by modulating an arrangement of said preamble information and said data over a base band range wherein preamble information symbols of the transmission symbol stream are disposed alternately with data symbols of the transmission symbol stream;
   transmission symbol stream expanding means for selectively expanding, from the transmission symbol stream, only the preamble information symbols of the alternating preamble information and data symbols of said transmission symbol stream on a frequency axis by generating a complex conjugate value of at least one part of the preamble information, symmetrically on said frequency axis, to obtain an expanded transmission symbol stream; and
   a transmitting means for transmitting an output transmission signal corresponding to the expanded transmission symbol stream.

19. The multi-carrier signal transmission apparatus according to claim 18, wherein the only preamble information symbols of the alternating preamble information and data symbols of said transmission symbol stream are expanded on said frequency axis symmetrically about a reference position.

20. A multi-carrier signal transmission apparatus for transmitting a transmission stream including at least preamble information for synchronizing a transmission signal and data information as a multi-carrier signal in a radio transmission system, the apparatus comprising:
   a processing device and a memory including instructions which, when executed by the processing device, control
      generating a transmission symbol stream by modulating an arrangement of said preamble information and said data information over a base band range, wherein preamble information symbols of the transmission symbol stream are disposed alternately with data symbols of the transmission symbol stream;
      selectively expanding, from the transmission symbol stream, only the preamble information symbols of the alternating preamble information and data symbols of said transmission symbol stream on a frequency axis by generating a complex conjugate value of at least one part of the preamble information, symmetrically on the frequency axis, to obtain an expanded transmission symbol stream; and
      transmitting an output transmission signal corresponding to the expanded transmission symbol stream.

21. The multi-carrier signal transmission apparatus according to claim 20, wherein the only preamble information symbols of the alternating preamble information and data symbols of the transmission symbol stream are expanded on said frequency axis symmetrically about a reference position.

22. A multi-carrier signal transmission apparatus for transmitting a transmission stream including at least preamble information for synchronizing a transmission signal and data information as a multi-carrier signal in a radio transmission system, the apparatus comprising:
   modulation means for generating a transmission symbol stream by modulating an arrangement of said preamble information and said data;
   transmission symbol stream expanding means for selectively expanding, from said transmission symbol stream, said preamble information on a frequency axis by generating a complex conjugate value of at least one part of the preamble information, symmetrically on said frequency axis, to obtain an expanded transmission symbol stream, the expanding of said transmission symbol stream being carried out only in a time slot for transmitting the preamble information and not being carried in a time slot for transmitting the data; and
   a transmitting means for transmitting an output transmission signal corresponding to the expanded transmission symbol stream.

23. The multi-carrier signal transmission apparatus according to claim 18, wherein said transmission symbol stream is expanded on said frequency axis symmetrically about a reference position.

24. A multi-carrier signal transmission apparatus for transmitting a transmission stream including at least preamble information for synchronizing a transmission signal and data information as a multi-carrier signal in a radio transmission system, the apparatus comprising:
   a processing device and a memory including instructions which, when executed by the processing device, control
      generating a transmission symbol stream by modulating an arrangement of said preamble information and said data information; and
      selectively expanding, from said transmission symbol stream, said preamble information on a frequency axis by generating a complex conjugate value of at least one part of the preamble information, symmetrically on the frequency axis, to obtain an expanded transmission symbol stream, the expanding of said transmission symbol stream being carried out only in a time slot for transmitting the preamble information and not being carried in a time slot for transmitting the data; and
      transmitting an output transmission signal corresponding to the expanded transmission symbol stream.

25. The multi-carrier signal transmission apparatus according to claim 24, wherein the transmission symbol stream is expanded on said frequency axis symmetrically about a reference position.

26. A multi-carrier signal transmission apparatus for transmitting a transmission stream including at least preamble information for synchronizing a transmission signal and data information as a multi-carrier signal in a radio transmission system, the apparatus comprising:
    a processing device and a memory including instructions which, when executed by the processing device, control
        generating a transmission symbol stream by modulating an arrangement of the preamble information and the data information;
        selectively expanding, from the transmission symbol stream, the preamble information on a frequency axis by generating a complex conjugate value of at least one part of the preamble information symmetrically on the frequency axis, to obtain an expanded transmission symbol stream; and
        transmitting an output transmission signal corresponding to the expanded transmission symbol stream.

27. The multi-carrier signal transmission apparatus according to claim 26, wherein the transmission symbol stream is expanded symmetrically about a reference position on the frequency axis.

28. A multi-carrier signal transmission apparatus for transmitting a transmission stream including at least preamble information for synchronizing a transmission signal and data information as a multi-carrier signal in a radio transmission system, the apparatus comprising:
    modulation means for generating a transmission symbol stream by modulating an arrangement of the preamble information and the data;
    transmission symbol stream expanding means for selectively expanding, from the transmission symbol stream, the preamble information on a frequency axis by generating a complex conjugate value of at least one part of the preamble information symmetrically on the frequency axis, to obtain an expanded transmission symbol stream; and
    a transmitting means for transmitting an output transmission signal corresponding to the expanded transmission symbol stream.

29. The multi-carrier signal transmission apparatus according to claim 28, wherein the transmission symbol stream is expanded symmetrically about a reference position on the frequency axis.

30. A multi-carrier signal transmission apparatus for transmitting a transmission stream as a multi-carrier signal in a radio transmission system, the apparatus comprising:
    a processing device and a memory including instructions which, when executed by the processing device, control
        generating a modulated transmission symbol stream by modulating an arrangement of information for synchronizing a transmission signal and data information; and
        selectively expanding, from the modulated transmission symbol stream of the information for synchronizing the transmission signal and the data information, the information for synchronizing the transmission signal symmetrically on a frequency axis, to obtain an expanded transmission symbol stream; and
        transmitting an output transmission signal corresponding to the expanded transmission symbol stream.

31. The multi-carrier signal transmission apparatus according to claim 30, wherein the expanding portion expands the modulated transmission symbol stream on the frequency axis by generating a complex conjugate value of at least one part of the information for synchronizing the transmission signal symmetrically on the frequency axis.

32. The multi-carrier signal transmission apparatus according to claim 31, wherein the modulated transmission symbol stream is expanded symmetrically about a reference position on the frequency axis.

33. A multi-carrier signal transmission apparatus for transmitting a transmission stream as a multi-carrier signal in a radio transmission system, the apparatus comprising:
    a processing device and a memory including instructions which, when executed by the processing device, control
        generating a modulated transmission symbol stream by modulating an arrangement of information for synchronizing a transmission signal and data;
        selectively expanding, from the modulated transmission symbol stream of the information for synchronizing the transmission signal and the data, the information for synchronizing the transmission signal symmetrically on a frequency axis, to obtain an expanded transmission symbol stream; and
        transmitting an output transmission signal corresponding to the expanded transmission symbol stream.

34. The multi-carrier signal transmission apparatus according to claim 33, wherein the modulated transmission symbol stream is expanded on the frequency axis by generating a complex conjugate value of at least one part of the information for synchronizing the transmission signal symmetrically on the frequency axis.

35. The multi-carrier signal transmission apparatus according to claim 34, wherein the modulated transmission symbol stream is expanded symmetrically about a reference position on the frequency axis.

36. A multi-carrier signal transmission method for transmitting a transmission stream as a multi-carrier signal in a radio transmission system, the method comprising:
    generating a modulated transmission symbol stream by modulating an arrangement of information for synchronizing a transmission signal and data; and
    selectively expanding, from the modulated transmission symbol stream of the information for synchronizing the transmission signal and the data, the information for synchronizing the transmission signal symmetrically on a frequency axis, to obtain an expanded transmission symbol stream; and
    transmitting an output transmission signal corresponding to the expanded transmission symbol stream.

37. The multi-carrier signal transmission method according to claim 36, wherein the expanding step expands the modulated transmission symbol stream on the frequency axis by generating a complex conjugate value of at least one part of the information for synchronizing the transmission signal symmetrically on the frequency axis.

38. The multi-carrier signal transmission method according to claim 37, wherein the modulated transmission symbol stream is expanded symmetrically about a reference position on the frequency axis.

* * * * *

UNITED STATES PATENT AND TRADEMARK OFFICE
CERTIFICATE OF CORRECTION

| | | |
|---|---|---|
| PATENT NO. | : 10,038,580 B2 | Page 1 of 1 |
| APPLICATION NO. | : 14/144816 | |
| DATED | : July 31, 2018 | |
| INVENTOR(S) | : Hideki Iwami | |

It is certified that error appears in the above-identified patent and that said Letters Patent is hereby corrected as shown below:

On the Title Page

On Page 2, item (63), Column 1, under "Related U.S. Application Data", Line 2, delete "2000." and insert -- 2000, now Pat. No. 6,982,992. --, therefor.

In the Specification

In Column 1, Line 13, after "continuation of" insert -- U.S. application --.

In the Claims

In Column 15, in Claim 7, Line 48, after "stream" insert -- ; and --.

In Column 17, in Claim 16, Line 16, after "information;" delete "and".

In Column 18, in Claim 24, Line 55, after "information;" delete "and".

In Column 19, in Claim 30, Lines 56-57, after "information;" delete "and".

In Column 20, in Claim 36, Line 46, after "data;" delete "and".

Signed and Sealed this
Seventeenth Day of March, 2020

Andrei Iancu
*Director of the United States Patent and Trademark Office*